US011843298B2

United States Patent
Ando et al.

(10) Patent No.: US 11,843,298 B2
(45) Date of Patent: Dec. 12, 2023

(54) ACTUATOR WITH CONNECTION BODY HAVING VISCOELASTICITY AND AN AIR PASSAGE THROUGH THE PARTITION PART

(71) Applicant: NIDEC SANKYO CORPORATION, Nagano (JP)

(72) Inventors: Masaaki Ando, Nagano (JP); Akira Mori, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 194 days.

(21) Appl. No.: 17/242,274

(22) Filed: Apr. 27, 2021

(65) Prior Publication Data
US 2021/0336521 A1   Oct. 28, 2021

(30) Foreign Application Priority Data
Apr. 28, 2020 (JP) .................................. 2020-079167

(51) Int. Cl.
 *H02K 33/18* (2006.01)
(52) U.S. Cl.
 CPC ..................................... *H02K 33/18* (2013.01)
(58) Field of Classification Search
 CPC ........ H02K 35/00; H02K 35/02; H02K 35/04; H02K 35/06; H02K 33/16; H02K 33/18;
 (Continued)

(56) References Cited

U.S. PATENT DOCUMENTS 4,412,317 A * 10/1983 Asjes ...................... G01V 1/181
 367/187
5,818,131 A * 10/1998 Zhang .................. F04D 13/0646
 310/90.5

(Continued)

FOREIGN PATENT DOCUMENTS

| CN | 101860163 | 10/2010 |
| CN | 106575913 | 4/2017 |

(Continued)

OTHER PUBLICATIONS

JP-2019013086-A English Translation.*

(Continued)

*Primary Examiner* — Maged M Almawri
(74) *Attorney, Agent, or Firm* — JCIPRNET

(57) ABSTRACT

An actuator includes a support body, a movable body, a connection body connected with the support body and the movable body and provided with at least one of elasticity and viscoelasticity, and a magnetic drive mechanism structured to relatively move the movable body with respect to the support body. The connection body is disposed in a space in a radial direction between an inner side ring-shaped part provided in one of the movable body and the support body and an outer side ring-shaped part provided in the other of the movable body and the support body. The inner side ring-shaped part, the outer side ring-shaped part and the connection body structure a partition part which partitions an inside space of the case, and the partition part includes an air passage which is penetrated through the partition part in an axial line direction so that air resistance can be reduced.

11 Claims, 7 Drawing Sheets

(58) Field of Classification Search
CPC ........ H02K 33/00; H02K 33/02; H02K 33/04;
H02K 33/06; H02K 5/00; H02K 5/10;
H02K 5/128; H02K 5/1282; H02N 11/00;
H02N 11/002; H02N 11/04
USPC ........... 310/29, 25, 15, 24, 12, 12.12, 12.01,
310/12.03, 12.13, 12.16, 12.211, 2.24,
310/12.26
See application file for complete search history.

(56) References Cited

U.S. PATENT DOCUMENTS

| | | | | |
|---|---|---|---|---|
| 6,326,706 B1* | 12/2001 | Zhang | ................ | F04B 35/045 310/12.32 |
| 6,501,357 B2* | 12/2002 | Petro | ................ | H02K 33/16 335/229 |
| 6,644,943 B1* | 11/2003 | Lilie | ................ | F04B 35/045 417/418 |
| 6,737,780 B1* | 5/2004 | Fisher | ................ | H02K 1/17 310/154.14 |
| 6,983,923 B2* | 1/2006 | Fukui | ................ | F16K 31/082 335/229 |
| 7,078,832 B2* | 7/2006 | Inagaki | ................ | H02K 7/14 335/238 |
| 7,449,803 B2* | 11/2008 | Sahyoun | ................ | H02K 33/16 310/23 |
| 7,573,163 B2* | 8/2009 | Tu | ................ | H02K 39/00 310/12.21 |
| 7,586,220 B2* | 9/2009 | Roberts | ................ | H02K 1/34 290/1 R |
| 7,671,493 B2* | 3/2010 | Takashima | ................ | G06F 3/016 310/15 |
| 7,791,456 B2* | 9/2010 | Miura | ................ | B06B 1/045 340/407.1 |
| 7,911,098 B2* | 3/2011 | Lee | ................ | H02K 33/16 310/20 |
| 7,948,124 B1* | 5/2011 | Waters | ................ | H02K 35/00 310/36 |
| 8,013,480 B2* | 9/2011 | Bang | ................ | B06B 1/045 310/12.33 |
| 8,053,941 B2* | 11/2011 | Moore | ................ | H02K 5/128 310/86 |
| 8,097,991 B2* | 1/2012 | Masami | ................ | H02K 33/16 310/15 |
| 8,188,623 B2* | 5/2012 | Park | ................ | H02K 33/16 310/12.01 |
| 8,278,786 B2* | 10/2012 | Woo | ................ | H02K 33/16 310/15 |
| 8,288,899 B2* | 10/2012 | Park | ................ | H02K 33/16 310/71 |
| 8,314,519 B2* | 11/2012 | Eckstein | ................ | F16H 25/20 310/12.01 |
| 8,325,477 B2 | 12/2012 | Ishikawa et al. | | |
| 8,446,055 B2* | 5/2013 | Jun | ................ | H02K 33/16 310/23 |
| 8,456,032 B2* | 6/2013 | Hochberg | ................ | H02K 7/06 290/43 |
| 8,492,937 B2* | 7/2013 | Roberts | ................ | H02K 1/34 310/32 |
| 8,531,063 B2 | 9/2013 | Lee et al. | | |
| 8,575,794 B2* | 11/2013 | Lee | ................ | H02K 33/18 310/15 |
| 8,593,017 B2* | 11/2013 | Stefanini | ................ | H02K 35/02 290/1 R |
| 8,629,569 B2* | 1/2014 | Roberts | ................ | H02K 35/06 290/1 R |
| 8,736,086 B2* | 5/2014 | Yang | ................ | H02K 35/02 290/1 R |
| 8,941,272 B2* | 1/2015 | Hong | ................ | H02K 33/18 310/15 |
| 9,461,530 B2* | 10/2016 | Wasenczuk | ................ | B06B 1/04 |
| 9,695,806 B2* | 7/2017 | Van Brunt | ................ | H02K 33/16 |
| 9,815,085 B2* | 11/2017 | Chun | ................ | G06F 3/016 |
| 9,906,109 B2* | 2/2018 | Endo | ................ | H02K 33/16 |
| 10,079,531 B2* | 9/2018 | Xu | ................ | H02K 5/04 |
| 10,252,295 B2 | 4/2019 | Takeda et al. | | |
| 10,307,791 B2* | 6/2019 | Xu | ................ | B06B 1/045 |
| 10,328,461 B2* | 6/2019 | Xu | ................ | B06B 1/045 |
| 10,451,134 B2 | 10/2019 | Kanaya | | |
| 10,486,196 B2* | 11/2019 | Chai | ................ | B06B 1/045 |
| 10,622,538 B2* | 4/2020 | Zhang | ................ | G06F 3/04886 |
| 10,710,115 B2* | 7/2020 | Huang | ................ | H02K 33/02 |
| 11,031,857 B2* | 6/2021 | Wasenczuk | ............ | H02N 2/186 |
| 11,152,843 B2* | 10/2021 | Wasenczuk | ................ | H02K 1/34 |
| 11,418,099 B2* | 8/2022 | Takahashi | ................ | H02K 33/16 |
| 2004/0119343 A1* | 6/2004 | Ueda | ................ | G10K 9/18 310/12.31 |
| 2004/0251748 A1* | 12/2004 | Inagaki | ................ | F04B 35/045 310/14 |
| 2005/0225181 A1* | 10/2005 | Tu | ................ | H02K 35/00 310/15 |
| 2006/0002577 A1* | 1/2006 | Won | ................ | B06B 1/045 381/396 |
| 2007/0052302 A1* | 3/2007 | Cheung | ................ | B82Y 25/00 310/12.25 |
| 2007/0085425 A1* | 4/2007 | Hirashima | ............ | H02K 33/16 310/15 |
| 2007/0182257 A1* | 8/2007 | Miura | ................ | H04R 9/02 310/23 |
| 2008/0265692 A1* | 10/2008 | Roberts | ................ | H02K 1/34 310/15 |
| 2009/0250032 A1* | 10/2009 | Fullerton | ................ | H03K 3/45 123/143 B |
| 2010/0327672 A1* | 12/2010 | Roberts | ................ | H02K 1/34 310/25 |
| 2011/0018364 A1* | 1/2011 | Kim | ................ | H02K 33/18 310/20 |
| 2011/0018365 A1* | 1/2011 | Kim | ................ | B06B 1/045 310/20 |
| 2011/0062803 A1* | 3/2011 | Lee | ................ | H02K 33/18 310/29 |
| 2011/0068640 A1* | 3/2011 | Choi | ................ | H02K 5/04 310/25 |
| 2011/0089773 A1* | 4/2011 | Choi | ................ | H02K 33/16 310/25 |
| 2011/0133577 A1* | 6/2011 | Lee | ................ | H02K 33/18 310/15 |
| 2011/0193426 A1* | 8/2011 | Chung | ................ | H02K 33/16 310/25 |
| 2011/0198948 A1* | 8/2011 | Keisuke | ................ | H02K 5/225 310/25 |
| 2011/0198949 A1* | 8/2011 | Furuich | ................ | H02K 33/16 310/25 |
| 2011/0291497 A1* | 12/2011 | Choi | ................ | H02K 33/18 310/25 |
| 2012/0032535 A1* | 2/2012 | Park | ................ | H02K 35/02 310/25 |
| 2012/0098380 A1* | 4/2012 | Wang | ................ | H02K 15/0442 310/260 |
| 2012/0140414 A1 | 6/2012 | Ishikawa et al. | | |
| 2012/0146557 A1* | 6/2012 | Pyo | ................ | H02P 31/00 310/25 |
| 2012/0169148 A1* | 7/2012 | Kim | ................ | H02K 33/16 310/25 |
| 2012/0293022 A1* | 11/2012 | Park | ................ | B06B 1/045 310/25 |
| 2013/0033128 A1* | 2/2013 | Yoon | ................ | H02K 33/18 310/25 |
| 2013/0033129 A1* | 2/2013 | Hong | ................ | B06B 1/045 310/25 |
| 2013/0043766 A1* | 2/2013 | Takahashi | ............ | H04R 17/00 310/326 |
| 2013/0099600 A1* | 4/2013 | Park | ................ | B06B 1/045 310/15 |
| 2013/0285479 A1* | 10/2013 | Kinoshita | ............ | H02K 35/02 310/12.12 |
| 2014/0054984 A1* | 2/2014 | Tang | ................ | H02K 33/18 310/28 |

(56) References Cited

U.S. PATENT DOCUMENTS

| | | | |
|---|---|---|---|
| 2014/0062225 A1* | 3/2014 | Kim | H02K 33/00 310/15 |
| 2014/0077628 A1* | 3/2014 | Yamada | H02K 33/12 310/12.16 |
| 2014/0084710 A1* | 3/2014 | Endo | H02K 33/16 310/25 |
| 2014/0103751 A1* | 4/2014 | Furukawa | H02K 35/02 310/25 |
| 2014/0132089 A1* | 5/2014 | Jeon | H02K 33/18 310/14 |
| 2014/0265651 A1* | 9/2014 | Kim | H02K 33/16 310/25 |
| 2015/0194870 A1* | 7/2015 | Kim | H02K 33/18 310/25 |
| 2016/0013710 A1* | 1/2016 | Dong | H02K 33/16 310/25 |
| 2016/0126821 A1* | 5/2016 | Iwaki | H02K 7/08 310/12.21 |
| 2016/0149517 A1* | 5/2016 | Choi | H02N 1/04 427/58 |
| 2016/0149518 A1* | 5/2016 | Wang | F03B 13/14 310/310 |
| 2016/0190903 A1* | 6/2016 | Ohishi | H02K 35/04 310/28 |
| 2017/0033653 A1* | 2/2017 | Wang | H02K 33/16 |
| 2017/0033673 A1* | 2/2017 | Wang | H02K 33/16 |
| 2017/0110952 A1* | 4/2017 | Takeda | H02K 33/02 |
| 2017/0216885 A1* | 8/2017 | Takeda | H01F 7/1615 |
| 2017/0288523 A1* | 10/2017 | Katada | H02P 25/032 |
| 2017/0346376 A1* | 11/2017 | Kim | H02K 15/02 |
| 2018/0026514 A1* | 1/2018 | Mao | H02K 5/225 310/12.16 |
| 2018/0056329 A1* | 3/2018 | Akanuma | H02K 33/16 |
| 2018/0297074 A1* | 10/2018 | Huang | B06B 1/045 |
| 2019/0070635 A1* | 3/2019 | Takeda | H02K 33/18 |
| 2019/0267882 A1* | 8/2019 | Matsuyama | H02K 33/02 |
| 2020/0161955 A1 | 5/2020 | Kitahara et al. | |

FOREIGN PATENT DOCUMENTS

| | | | | |
|---|---|---|---|---|
| CN | 107420479 | | 12/2017 | |
| CN | 110799273 | | 2/2020 | |
| JP | 2016032416 | | 3/2016 | |
| JP | 2019013086 | | 1/2019 | |
| JP | 2019013086 A | * | 1/2019 | H02K 33/06 |
| TW | 200710637 | | 3/2007 | |

OTHER PUBLICATIONS

Haifeng Lu et al., "Design of Tuned Helmholtz Resonator Muffler", Journal of Vibration, Measurement & Diagnosis, Dec. 2012, with English abstract, pp. 1021-1025 and pp. 1041, vol. 32, No. 6.

"Office Action of China Counterpart Application", dated Jun. 1, 2023, with English translation thereof, pp. 1-12.

* cited by examiner

ACTUATOR WITH CONNECTION BODY HAVING VISCOELASTICITY AND AN AIR PASSAGE THROUGH THE PARTITION PART

CROSS REFERENCE TO RELATED APPLICATION

The present invention claims priority under 35 U.S.C. § 119 to Japanese Application No. 2020-079167 filed Apr. 28, 2020, the entire content of which is incorporated herein by reference.

TECHNICAL FIELD

At least an embodiment of the present invention may relate to an actuator which is structured so that a movable body is relatively moved with respect to a support body.

BACKGROUND

An actuator has been proposed which includes a support body, a movable body, and a magnetic drive mechanism structured to vibrate the movable body with respect to the support body and, in the actuator, the movable body and the support body are connected with each other by a connection body having elasticity and viscoelasticity. In Japanese Patent Laid-Open No. 2019-13086 (Patent Literature 1), an actuator is disclosed in which a movable body is disposed in an inside of a cover formed in a rectangular parallelepiped shape and the movable body is vibrated in a longitudinal direction of the cover. In the actuator described in Patent Literature 1, a connection body is a gel member which is formed by cutting sheet-shaped gel in a rectangular shape. The movable body includes a yoke to which a magnet is fixed, and one face of the gel member in a thickness direction is adhesively bonded to the yoke and the other face of the gel member is adhesively bonded to a cover member.

The present inventors propose an actuator in which a movable body is accommodated on an inner side of a tube-shaped case and the movable body is vibrated in an axial line direction. The movable body includes a shaft which is extended in the axial line direction at a center of the case, and both ends in the axial line direction of the shaft are connected with the case through gel members in a cylindrical tube shape. Both ends of the case are closed by cap members. A cut-out part is formed in a side face of the case, and a circuit board for connecting a coil wire is fixed to the cut-out part.

In the actuator structured as described above, gap spaces between the case accommodating the movable body and the cap members closing both ends of the case and a gap space between the circuit board and the case serve as air flowing ports for communicating between the inside and the outside of the case. Therefore, contaminations may enter through the air flowing port and thus, the contaminations may adhere to a magnetic drive mechanism and a gel member to cause to affect adversely. Further, operation sound generated when the movable body is vibrated may leak to the outside of the case through the air flowing port.

In order to prevent the above-mentioned problem, it is conceivable that the gap spaces between the case and the cap members and the gap space between the circuit board and the case are sealed by an adhesive or the like so that no air flowing port is formed. However, in a structure that a movable body and a support body are connect with each other through a gel member formed in a cylindrical tube shape as described above, an inner peripheral part of the gel member is connected with the movable body over the entire periphery and an outer peripheral part of the gel member is connected with the support body over the entire periphery. Therefore, a partition part partitioning the inside of the case in an axial line direction is formed by the gel member through which air is unable to pass. Accordingly, air fluidity in the inside of the case is low and thus, in a case that an air flowing port communicating the inside of the case with the outside is sealed, air resistance is generated when the movable body is vibrated and the vibration characteristic varies due to influence of the air resistance.

SUMMARY

In view of the problem described above, at least an embodiment of the present invention may advantageously provide an actuator in which air resistance when a movable body is vibrated is reduced.

According to at least an embodiment of the present invention, there may be provided an actuator including a support body, a movable body, a connection body which is connected with the support body and the movable body and is provided with at least one of elasticity and viscoelasticity, and a magnetic drive mechanism which includes a magnet and a coil and is structured to relatively move the movable body with respect to the support body. One of the movable body and the support body includes a support shaft which supports one of the magnet and the coil on an inner peripheral side with respect to the other of the movable body and the support body, and an inner side ring-shaped part which surrounds the support shaft. The other of the movable body and the support body includes an outer side ring-shaped part which faces the inner side ring-shaped part in a radial direction, a case in a tube shape which surrounds an outer peripheral side of the outer side ring-shaped part, and a cap member which closes an end part of the case. The connection body is disposed in a gap space in the radial direction between the inner side ring-shaped part and the outer side ring-shaped part, the inner side ring-shaped part, the outer side ring-shaped part and the connection body structure a partition part which partitions an inside space of the case in an axial line direction of the support shaft, and the partition part is provided with an air passage which is penetrated through the partition part in the axial line direction.

In accordance with at least an embodiment of the present invention, one of the movable body and the support body includes the support shaft, and the other of the movable body and the support body includes the tube-shaped case and the cap member. The connection body which connects the movable body with the support body is disposed in a gap space between the inner side ring-shaped part surrounding the support shaft and the outer side ring-shaped part which is disposed on an inner peripheral side of the case. Therefore, an inside space of the case is provided with the partition part structured of the connection body and the inner side ring-shaped part and the outer side ring-shaped part which are connected with an inner peripheral part and an outer peripheral part of the connection body. However, the partition part is provided with the air passage. Accordingly, air is capable of flowing through the air passage and thus, even in a case that a gap space between the case and the cap member is sealed, air resistance when the movable body is vibrated in the axial line direction can be reduced. As a result, variation of the vibration characteristic due to air resistance can be suppressed.

In at least an embodiment of the present invention, the inner side ring-shaped part is an inner frame member which is fixed to the support shaft, the outer side ring-shaped part includes an outer frame member surrounding the inner frame member and an outer frame member fixing part surrounding the outer frame member, the connection body connects the outer frame member with the inner frame member, and the air passage is provided between the outer frame member and the outer frame member fixing part. According to this structure, the air passage can be formed by assembling the outer frame member and the outer frame member fixing part and thus, a part itself is not required to form a penetration part which serves as the air passage. Therefore, a shape of a part can be simplified.

In at least an embodiment of the present invention, the connection body is a gel member which is molded between the outer frame member and the inner frame member. As described above, a gel member is directly molded between the outer frame member and the inner frame member to form as one component and thus, the gel member is easily handled when the actuator is to be assembled. Therefore, the actuator is easily manufactured.

In at least an embodiment of the present invention, the connection body includes a first connection body which connects one end in the axial line direction of the movable body with the support body, and a second connection body which connects the other end in the axial line direction of the movable body with the support body, the inner side ring-shaped part includes a first inner side ring-shaped part connected with the first connection body and a second inner side ring-shaped part connected with the second connection body, and the outer side ring-shaped part includes a first outer side ring-shaped part connected with the first connection body and a second outer side ring-shaped part connected with the second connection body. The partition part includes a first partition part provided with the first inner side ring-shaped part, the first outer side ring-shaped part and the first connection body, and a second partition part provided with the second inner side ring-shaped part, the second outer side ring-shaped part and the second connection body, and the air passage includes a first air passage provided in the first partition part and a second air passage provided in the second partition part. According to this structure, both ends of the movable body can be supported by the connection bodies and thus, the movable body can be stably supported. Further, the partition part is formed at two positions, but each of the partition parts is provided with the air passage. Therefore, air resistance when the movable body is vibrated in the axial line direction can be reduced.

In at least an embodiment of the present invention, the first inner side ring-shaped part is a first inner frame member which is fixed to the support shaft, the first outer side ring-shaped part includes a first outer frame member surrounding the first inner frame member and a first outer frame member fixing part surrounding the first outer frame member, and the first outer frame member fixing part is provided in a coil holder which is disposed on an inner peripheral side of the case. According to this structure, the connection body can be supported by utilizing the coil holder and thus, the first outer frame member fixing part is not required to provide in a portion different from the coil holder. Therefore, a structure of the actuator can be simplified. Further, the connection body can be disposed on an inner peripheral side with respect to the coil holder and thus, a size in the axial line direction of the actuator can be reduced.

In at least an embodiment of the present invention, the first air passage is provided between the first outer frame member and the first outer frame member fixing part. According to this structure, when the first outer frame member and the first outer frame member fixing part are assembled, the air passage is formed between both parts and thus, the part itself is not required to form a penetration part which serves as an air passage. Therefore, a shape of the part can be simplified.

For example, an inner peripheral face of the first outer frame member fixing part is provided with a groove part which is extended in the axial line direction, and the first air passage is a gap space between the groove part and an outer peripheral face of the first outer frame member. Therefore, when a part such as a coil holder provided with the first outer frame member fixing part is to be manufactured by using resin, it is sufficient that a groove part which is utilized as an air passage is formed on a face to which the first outer frame member is fixed and, when the first outer frame member and the first outer frame member fixing part are assembled, an air passage can be formed between the parts.

In at least an embodiment of the present invention, the coil holder is adhesively bonded to an inner peripheral face of the case. As described above, even in a case that a gap space between the case and the coil holder is sealed by an adhesive, according to at least an embodiment of the present invention, an air passage is secured in another portion. Therefore, air resistance when the movable body is vibrated in the axial line direction can be reduced.

In at least an embodiment of the present invention, the cap member includes a first cap member which closes one end of the case and a second cap member which closes the other end of the case, and a gap space between the case and the first cap member and a gap space between the case and the second cap member are sealed by sealing material. According to this structure, entering of contaminations can be restrained. Further, operation sound leaked out to the outside of the case can be reduced.

In at least an embodiment of the present invention, the case is provided with a cut-out part where a circuit board for supplying electric power to the coil is disposed, and a gap space between the case and the circuit board is sealed by sealing material. According to this structure, entering of contaminations through a gap space from which wiring for power feeding is extended can be suppressed. Further, operation sound leaked out to the outside of the case can be reduced.

In at least an embodiment of the present invention, the sealing material is an adhesive. According to this structure, a gap space is sealed by utilizing an adhesive with which two parts are fixed and thus, the gap space is easily sealed. Further, another process for applying sealing material is not required to perform.

In at least an embodiment of the present invention, the air passage is provided at a plurality of positions at intervals in a circumferential direction. According to this structure, air is capable of being flowed uniformly. Further, a flowing amount of air is increased and thus, air resistance can be further reduced.

Effects of the Invention

According to at least an embodiment of the present invention, one of the movable body and the support body includes the support shaft, and the other of the movable body and the support body includes the tube-shaped case and the cap member. Although an inside space of the case is provided with the partition part which is structured of the connection body connecting the movable body with the support body, and the inner side ring-shaped part and the outer side ring-shaped part which are connected with the inner peripheral part and the outer peripheral part of the connection body, the partition part is provided with the air passage. Therefore, air is capable of flowing through the air passage and thus, even in a case that a gap space between the case and the cap member is sealed, air resistance when the movable body is vibrated in the axial line direction can be reduced. Accordingly, variation of vibration characteristics due to air resistance can be suppressed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
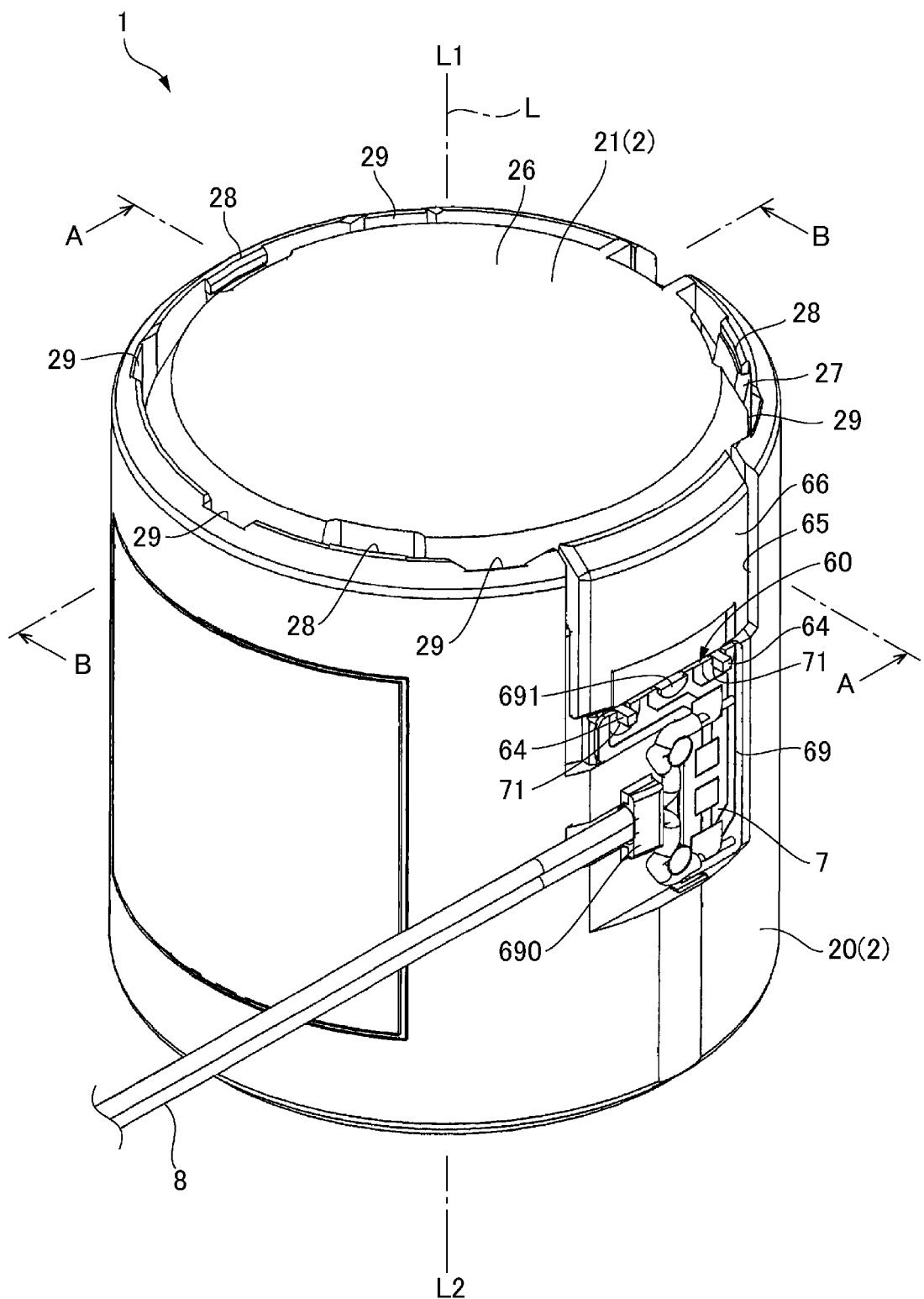
FIG. 1 is a perspective view showing an actuator in accordance with an embodiment of the present invention.

An embodiment of the present invention will be described below with reference to the accompanying drawings. In the following descriptions, a direction that a center axial line of a movable body 3 is extended is defined as an axial line "L" direction, and one side in the axial line "L" direction is referred to as "L1" and the other side in the axial line "L" direction is referred to as "L2". In an actuator 1 to which the present invention is applied, the movable body 3 is vibrated in the axial line "L" direction with respect to a support body 2.

In the embodiment described below, the movable body 3 is disposed on an inner peripheral side with respect to the support body 2. However, in the present invention, the movable body 3 may be disposed on an outer peripheral side with respect to the support body 2. Further, in the embodiment described below, the movable body 3 is connected with the support body 2 by a connection body 10 at two positions, i.e., on one side "L1" and the other side "L2" in the axial line "L" direction. However, in the present invention, the connection body 10 may be disposed at one position or three or more positions. Further, in the embodiment described below, a magnetic drive mechanism 6 which makes the movable body 3 vibrate with respect to the support body 2 includes a magnet 61 disposed on the movable body 3 and a coil 62 disposed on the support body 2. However, in the present invention, an arrangement of the magnet 61 and the coil 62 may be reversed. In other words, the magnetic drive mechanism 6 may include a coil 62 disposed on the movable body 3 and a magnet 61 disposed on the support body 2.

Entire Structure

Figure 2:
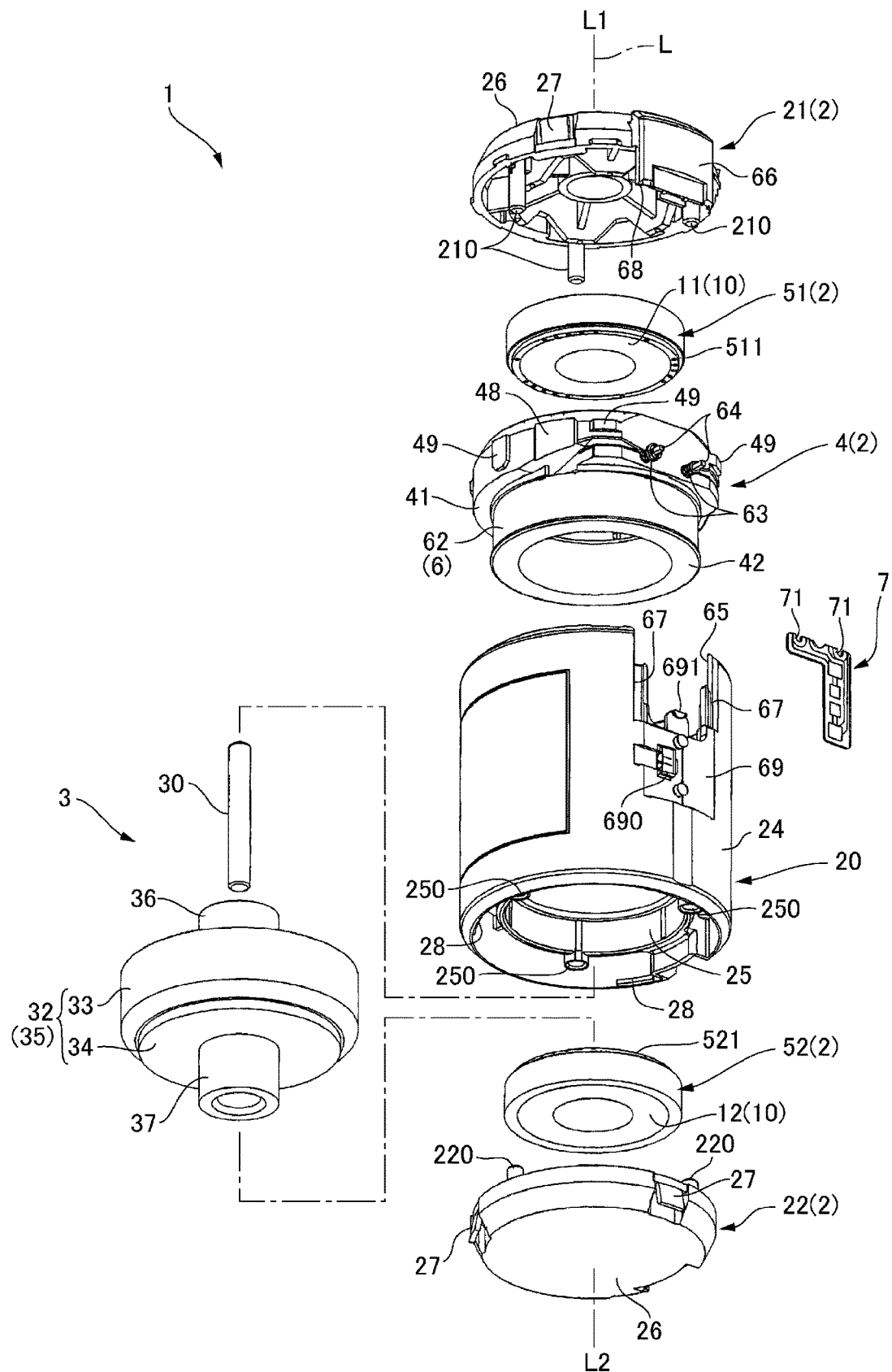
FIG. 2 is an exploded perspective view showing the actuator in FIG. 1.
Figure 3:
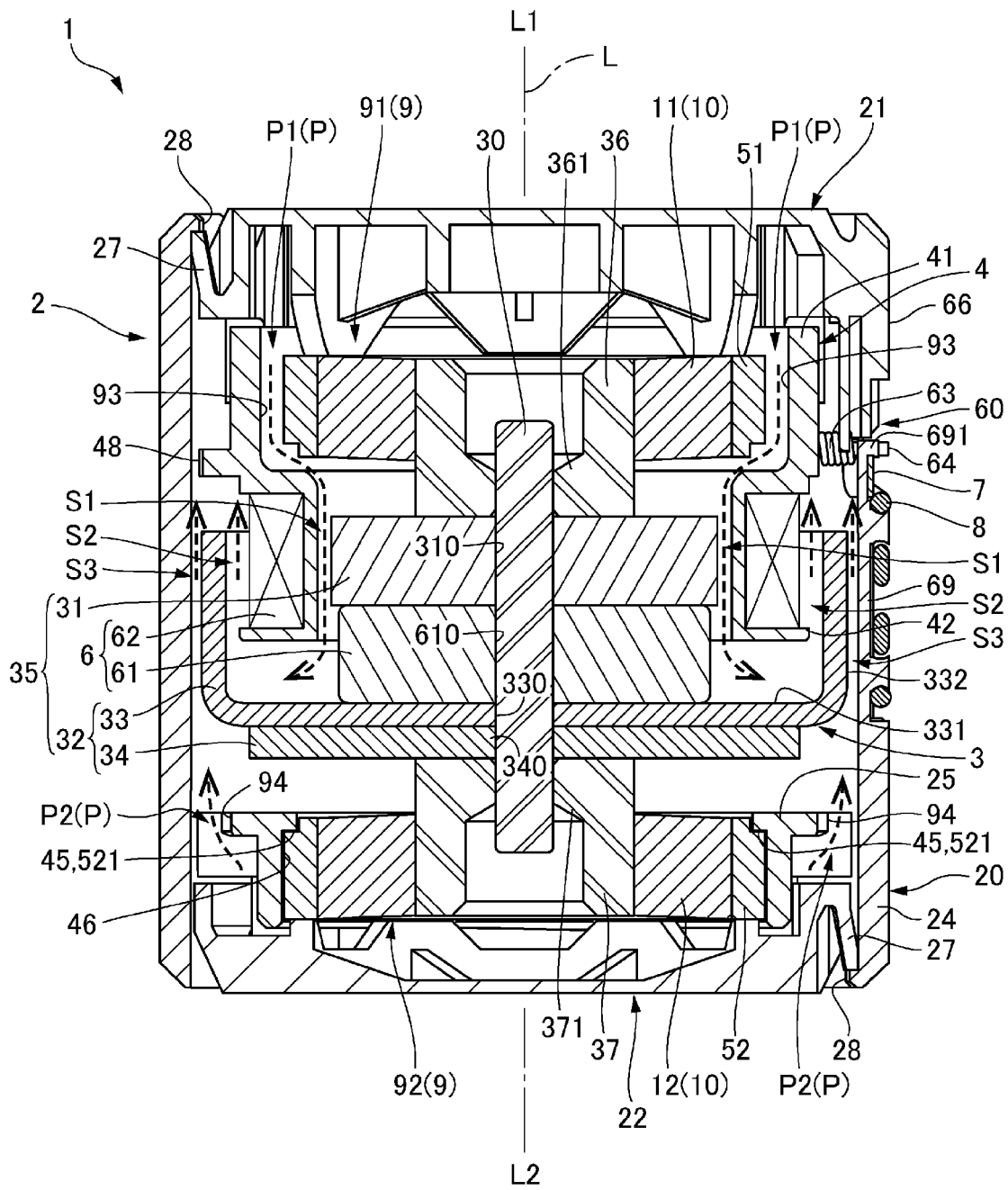
FIG. 3 is a cross-sectional view showing the actuator in FIG. 1 ("A-A" cross-sectional view in FIG. 1).
Figure 4:
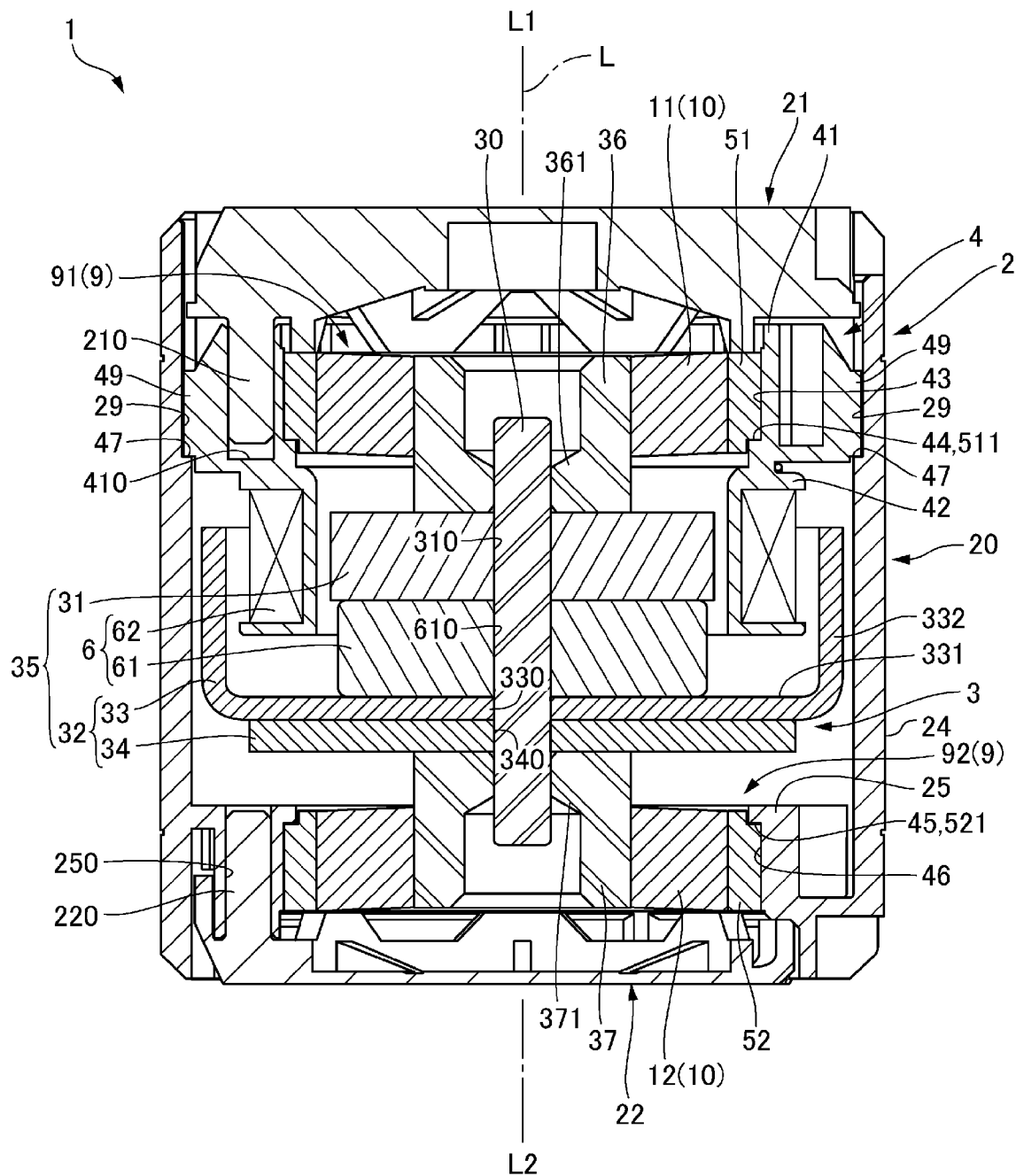
FIG. 4 is a cross-sectional view showing the actuator in FIG. 1 which is cut in a direction perpendicular to that in FIG. 3 ("B-B" cross-sectional view in FIG. 1).
Figure 5:
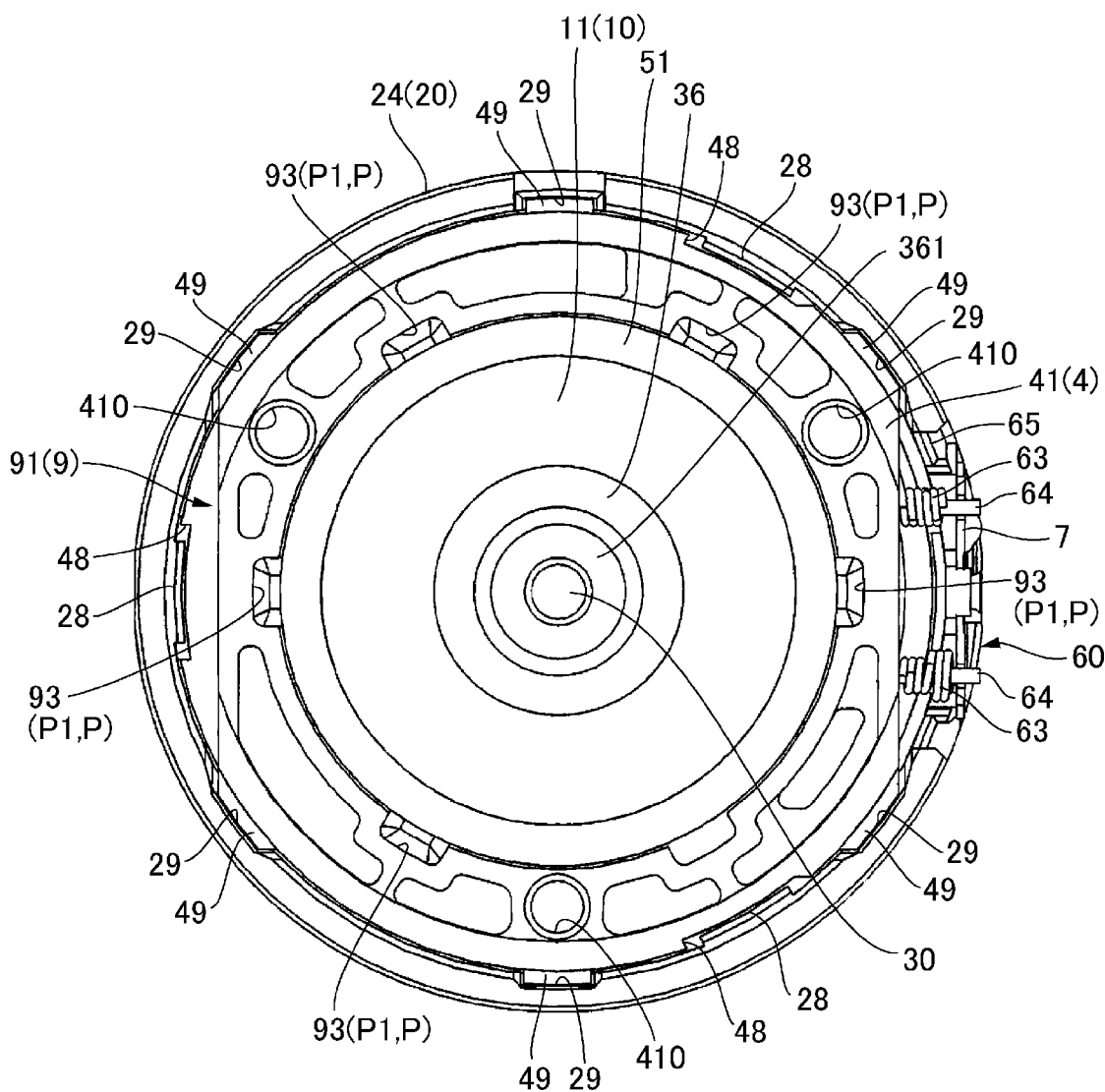
FIG. 5 is a plan view showing the actuator in which a first cap member is detached and which is viewed from one side in an axial line direction.
Figure 6:
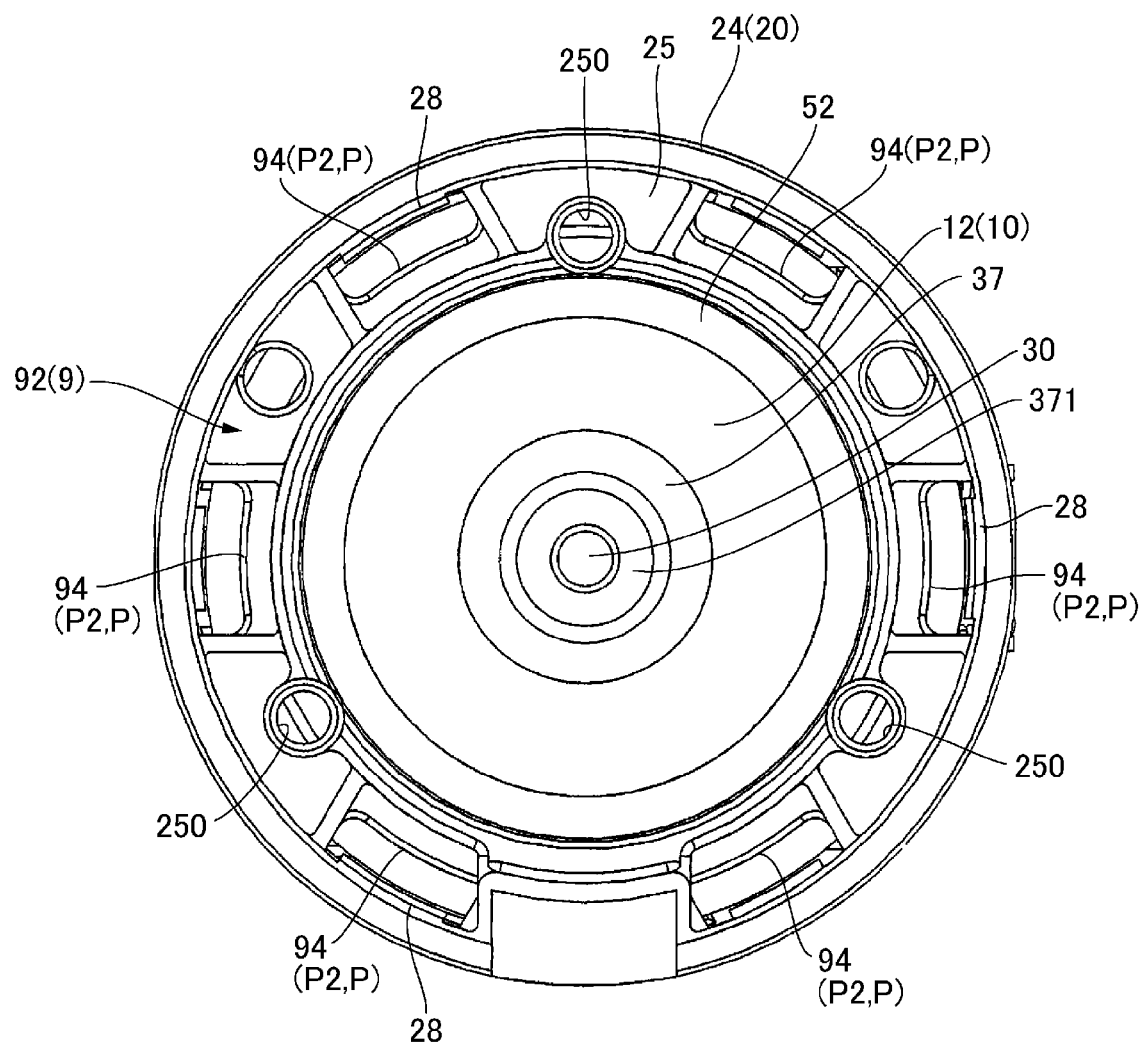
FIG. 6 is a plan view showing the actuator in which a second cap member is detached and which is viewed from the other side in the axial line direction.
Figure 7:
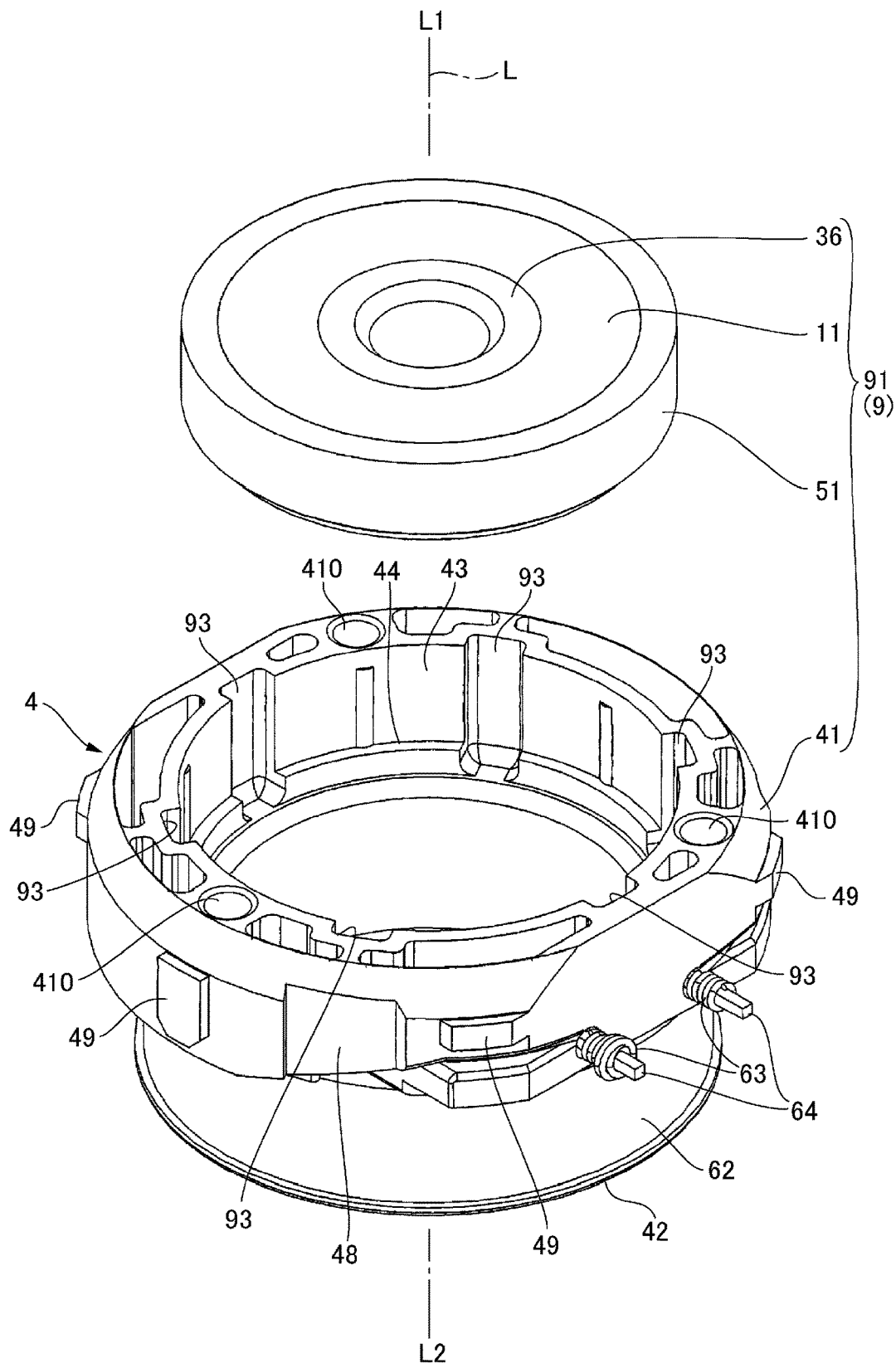
FIG. 7 is an exploded perspective view showing members which structure a first partition part.

FIG. 1 is a perspective view showing an actuator 1 in accordance with an embodiment of the present invention. FIG. 2 is an exploded perspective view showing the actuator 1 in FIG. 1. FIGS. 3 and 4 are cross-sectional views showing the actuator 1 in FIG. 1. FIG. 3 is a cross-sectional view showing the actuator 1 which is cut at the "A-A" position in FIG. 1. FIG. 4 is a cross-sectional view showing the actuator 1 which is cut at the "B-B" position in FIG. 1 and is a cross-sectional view in which the actuator 1 is cut in a direction perpendicular to that in FIG. 3. FIG. 5 is a plan view showing the actuator 1 in which a first cap member 21 is detached and which is viewed from one side "L1" in the axial line "L" direction. FIG. 6 is a plan view showing the actuator 1 in which a second cap member 22 is detached and which is viewed from the other side "L2" in the axial line "L" direction. FIG. 7 is an exploded perspective view showing members structuring a first partition part 91.

As shown in FIGS. 1 through 4, the actuator 1 includes a support body 2, a movable body 3, connection bodies 10 which are connected with the support body 2 and the movable body 3, and a magnetic drive mechanism 6 structured to relatively move the movable body 3 with respect to the support body 2. The connection body 10 is provided with at least one of elasticity and viscoelasticity. The magnetic drive mechanism 6 includes a magnet 61 disposed on the movable body 3 and a coil 62 disposed on the support body 2, and the magnetic drive mechanism 6 is structured so that the movable body 3 is relatively moved in the axial line "L" direction with respect to the support body 2. As shown in FIGS. 3 and 4, the movable body 3 is connected with the support body 2 through the connection body 10 at respective positions of an end part on one side "L1" in the axial line "L" direction and an end part on the other side "L2" in the axial line "L" direction.

Support Body

As shown in FIGS. 2 through 4, the support body 2 includes a tube-shaped case 20, a first cap member 21 which closes an opening of the case 20 on one side "L1" in the axial line "L" direction, a second cap member 22 which closes an opening of the case 20 on the other side "L2" in the axial line "L" direction, and a coil holder 4 which is disposed between the first cap member 21 and the second cap member 22 on an inner peripheral side of the case 20. In this embodiment, the case 20, the first cap member 21, the second cap member 22, and the coil holder 4 are made of resin. Further, the support body 2 includes a first outer frame member 51 fitted to an inner peripheral side of the coil holder 4 and a second outer frame member 52 fitted to an inner peripheral side of the case 20 at a position separated from the first outer frame member 51 to the other side "L2" in the axial line "L" direction. The first outer frame member 51 and the second outer frame member 52 are structured in the same shape and are disposed in a reverse posture in the axial line "L" direction.

Connection Body

The connection body 10 includes a first connection body 11 in a ring shape which is joined to an inner peripheral face of the first outer frame member 51, and a second connection body 12 in a ring shape which is joined to an inner peripheral face of the second outer frame member 52. The first connection body 11 is disposed on one end side of the movable body 3 in the axial line "L" direction, and the second connection body 12 is disposed on the other end side of the movable body 3 in the axial line "L" direction. As described below, the first connection body 11 and the second connection body 12 are gel members which are formed of molded gel material and are joined to the first outer frame member 51 and the second outer frame member 52 by adhesiveness of the gel member itself. In this embodiment, the first connection body 11 is connected with the support body 2 by press-fitting and fixing the first outer frame member 51 to the coil holder 4. Further, the second connection body 12 is connected with the support body 2 by press-fitting and fixing the second outer frame member 52 to the case 20.

Coil Holder

As shown in FIG. 2, the coil holder 4 is provided with a first outer frame member fixing part 41 formed in a ring shape and a body part 42 which is protruded from the first outer frame member fixing part 41 to the other side "L2" in the axial line "L" direction, and the coil 62 is disposed around the body part 42. End parts of a coil wire 63 extended from the coil 62 are bound to two terminal pins 64 which are protruded from the first outer frame member fixing part 41 of the coil holder 4 to an outer side in the radial direction. As shown in FIG. 1, the terminal pins 64 are protruded to the outside of the case 20 and are connected with a wiring circuit board 7.

As shown in FIG. 4, the coil holder 4 is provided with a first step part 44 which positions the first outer frame member 51 in the axial line "L" direction. The first outer frame member fixing part 41 surrounds an outer peripheral side of the first outer frame member 51. An inner peripheral face of the first outer frame member fixing part 41 is provided with a first recessed part 43 which is recessed to the other side "L2" in the axial line "L" direction, and the first outer frame member 51 is press-fitted to the first recessed part 43. The first step part 44 is provided at an end part of the first recessed part 43 on the other side "L2" in the axial line "L" direction. In this embodiment, a ring-shaped step part 511 formed on an outer peripheral face of the first outer frame member 51 is abutted with the first step part 44 in the axial line "L" direction.

Case

The case 20 is provided with a case main body 24 formed in a cylindrical tube shape and a second outer frame member fixing part 25 disposed on an inner peripheral side with respect to the case main body 24. As shown in FIG. 2, the second outer frame member fixing part 25 is protruded from an inner peripheral face of the case main body 24 to an inner peripheral side and is integrally molded together with the case main body 24. As shown in FIGS. 3 and 4, the second outer frame member fixing part 25 is disposed at a position separated to the other side "L2" in the axial line "L" direction with respect to the coil holder 4.

The case 20 is provided with a second step part 45 which positions the second outer frame member 52 in the axial line "L" direction. As shown in FIGS. 3 and 4, an inner peripheral face of the second outer frame member fixing part 25 is provided with a second recessed part 46 which is recessed to one side "L1" in the axial line "L" direction, and the second outer frame member 52 is press-fitted to the second recessed part 46. The second step part 45 is provided at an end part on one side "L1" in the axial line "L" direction of the second recessed part 46. In this embodiment, a ring-shaped step part 521 formed on an outer peripheral face of the second outer frame member 52 is abutted in the axial line "L" direction with respect to the second step part 45.

Further, the case 20 is provided with a third step part 47 which positions the coil holder 4 in the axial line "L" direction. As shown in FIG. 4, the third step part 47 is formed on an inner peripheral face of the case main body 24. As shown in FIG. 5, the inner peripheral face of the case main body 24 to which the coil holder 4 is fitted is formed with a plurality of groove parts 29 extended in the axial line "L" direction, and the third step part 47 is formed at an end part on the other side "L2" in the axial line "L" direction of each of the groove parts 29 (see FIG. 4). On the other hand, as shown in FIGS. 2, 4 and 5, the coil holder 4 is provided with a plurality of protruded parts 49 which are protruded from the outer peripheral face of the first outer frame member fixing part 41. When the support body 2 is to be assembled, each of the protruded parts 49 of the coil holder 4 is fitted to each of the groove parts 29 of the case main body 24 from one side "L1" in the axial line "L" direction and is abutted with the third step part 47 in the axial line "L" direction. As a result, the coil holder 4 is press-fitted and fixed to the case main body 24, and the coil holder 4 is positioned in the axial line "L" direction.

Cap Member

As shown in FIGS. 3 and 4, the first cap member 21 is fixed to the case main body 24 from one side "L1" in the axial line "L" direction with respect to the first outer frame member fixing part 41 provided in the coil holder 4. Further, the second cap member 22 is fixed to the case main body 24 from the other side "L2" in the axial line "L" direction with respect to the second outer frame member fixing part 25. As shown in FIG. 2, each of the first cap member 21 and the second cap member 22 is provided with a cover part 26 which is circular when viewed in the axial line "L" direction and a plurality of engaging parts 27 disposed at equal intervals at an outer peripheral edge of the cover part 26. In this embodiment, each of the first cap member 21 and the second cap member 22 is provided with three engaging parts 27. The engaging part 27 is a claw part which is inclined and extended in a direction enlarged from the cover part 26 to an outer peripheral side.

The engaging part 27 is elastically deformed in a radial direction and is pushed into an inner peripheral side of the case main body 24 together with the cover part 26. The case 20 is provided with a restriction part 28 which restricts disengagement of the engaging part 27 from an inner side of the case 20. The restriction part 28 is a protruded part which is protruded to an inner peripheral side from an end part of the case main body 24. As shown in FIGS. 1 and 2, the restriction part 28 is disposed at three positions at equal intervals in the end parts on one side "L1" and the other side "L2" in the axial line "L" direction of the case main body 24. The restriction part 28 is abutted with a tip end of the engaging part 27 in the axial line "L" direction.

The first cap member 21 is fixed to the case 20 by using an engagement structure of the engaging part 27 with the restriction part 28, together with fixing by an adhesive and welding. The adhesive is applied so as to serve as sealing material which seals a gap space between the end part on one side "L1" of the case 20 and the first cap member 21 after hardening. Therefore, in the support body 2 after having been assembled, a gap space between the first cap member 21 and the case 20 is sealed by an adhesive (not shown).

The first cap member 21 is fixed to the coil holder 4 by welding and is fixed to the case 20 through the coil holder 4. As shown in FIGS. 2 and 4, the first cap member 21 is provided with a plurality of welding protruded parts 210 which are protruded from the cover part 26 to the other side "L2" in the axial line "L" direction. In this embodiment, the welding protruded part 210 is disposed at three positions at equal intervals in the circumferential direction. On the other hand, as shown in FIGS. 4 and 5, the coil holder 4 is provided with three welding recessed parts 410 which face the cover part 26 in the axial line "L" direction. When the first cap member 21 is to be fixed to the case 20, as shown in FIG. 4, each of the welding protruded parts 210 is welded to each of the welding recessed parts 410 of the coil holder 4.

The second cap member 22 is, similarly to the first cap member 21, fixed to the case 20 by using an engagement structure of the engaging part 27 with the restriction part 28, together with fixing by an adhesive and welding. The adhesive is applied so as to serve as sealing material which seals a gap space between the end part on the other side "L2" of the case 20 and the second cap member 22 after hardening. Therefore, in the support body 2 after having been assembled, a gap space between the second cap member 22 and the case 20 is sealed by an adhesive (not shown).

The second cap member 22 is fixed to the second outer frame member fixing part 25 of the case 20 by welding. As shown in FIGS. 2 and 4, the second cap member 22 is provided with a plurality of welding protruded parts 220 which are protruded from the cover part 26 to one side "L1" in the axial line "L" direction. In this embodiment, the three welding protruded parts 210 are disposed at equal intervals in the circumferential direction. On the other hand, as shown in FIGS. 2, 4 and 6, the second outer frame member fixing part 25 is provided with three welding holes 250 which face the cover part 26 in the axial line "L" direction. When the second cap member 22 is to be fixed to the case 20, as shown in FIG. 4, each of the welding protruded parts 220 is welded to each of the welding holes 250 of the second outer frame member fixing part 25.

As shown in FIGS. 2 and 5, the first outer frame member fixing part 41 of the coil holder 4 is provided with groove parts 48 which are formed by cutting out its portion to an inner peripheral side at positions overlapped in the axial line "L" direction with the three restriction parts 28 provided in the case main body 24. Therefore, when the coil holder 4 is to be inserted to an inside of the case main body 24, interference of the first outer frame member fixing part 41 with the restriction parts 28 is avoided.

Wiring Lead-Out Part

As shown in FIGS. 1 and 3, the support body 2 includes a wiring lead-out part 60 for leading out terminal pins 64 around which coil wires 63 extended from the coil 62 of the magnetic drive mechanism 6 are bound to the outside. The wiring lead-out part 60 is a gap space provided between a cut-out part 65, which is formed by cutting out an edge on one side "L1" in the axial line "L" direction of the case 20 to the other side "L2" in the axial line "L" direction, and a cover 66 which is extended from a part in the circumferential direction of an outer peripheral edge of the first cap member 21 to the other side "L2" in the axial line "L" direction.

As shown in FIG. 5, the first outer frame member fixing part 41 of the coil holder 4 is disposed on an inner peripheral side of the cut-out part 65. In this embodiment, two terminal pins 64 extended from the first outer frame member fixing part 41 to an outer peripheral side are disposed in the wiring lead-out part 60. The coil wires 63 extended from the coil 62 are respectively bound to root portions of the terminal pins 64.

As shown in FIG. 2, each of edges on both sides in the circumferential direction of the cut-out part 65 is formed with a groove part 67 which is opened to an outer side in the radial direction. The cover 66 is provided with a curved shape which is located on a substantially same face as an outer peripheral face of the case main body 24, and each of edges on both sides in the circumferential direction of the cover 66 is provided with an engaging part 68 which is protruded to an inner side in the radial direction. When the cover 66 is to be inserted to the cut-out part 65 from one side in the axial line "L" direction, each of the engaging parts 68 of the cover 66 is inserted into each of two groove parts 67 provided at edges on both sides in the circumferential direction of the cut-out part 65. As a result, the edges of the cut-out part 65 are engaged with the cover 66 and thus, it is restrained that a width of the cut-out part 65 is widened and the case 20 is deformed.

The case 20 is provided with a circuit board fixing part 69 which is formed on the other side "L2" with respect to the cut-out part 65. An end part on one side "L1" of the wiring circuit board 7 which is fixed to the circuit board fixing part 69 is disposed in the wiring lead-out part 60. The terminal pins 64 are positioned in holding grooves 71 provided at an edge of the wiring circuit board 7 and are electrically connected with lands formed at edges of the holding groove 71. The wiring circuit board 7 is connected with lead wires 8 for power feeding to the coil 62. The circuit board fixing part 69 is provided with a lead wire holding part 690 for holding the lead wires 8 at a position adjacent to the wiring circuit board 7 in the circumferential direction.

The circuit board fixing part 69 is provided with a claw part 691 which is engaged with an edge of the wiring circuit board 7 disposed in the cut-out part 65. The wiring circuit board 7 is fixed to the circuit board fixing part 69 by using an engagement structure of the claw part 691 together with fixing of an adhesive. The adhesive for fixing the wiring circuit board 7 is applied so as to be sealing material which seals a gap space between the wiring circuit board 7 and the case 20 and a gap space between a tip end of the cover 66 and the wiring circuit board 7. Therefore, in the support body 2 after having been assembled, the gap space between the wiring circuit board 7 and the case 20 and the gap space between the wiring circuit board 7 and the first cap member 21 are completely sealed by the adhesive (not shown). Further, when the first cap member 21 is to be fixed to the case 20, the adhesive is also applied to a gap space between the cover 66 and the cut-out part 65. Therefore, the gap space between the cover 66 and the cut-out part 65 is also sealed by the adhesive (not shown).

Movable Body 3

As shown in FIGS. 2 through 4, the movable body 3 includes a support shaft 30 which is extended in the axial line "L" direction at a center in the radial direction of the support body 2. A magnet 61 and a yoke 35 are fixed to the support shaft 30 by a first inner frame member 36 formed in a tube shape and a second inner frame member 37 formed in a tube shape. The support shaft 30 is a round bar made of metal. The first inner frame member 36 and the second inner frame member 37 are circular tube bodies made of metal, and the first inner frame member 36 and the second inner frame member 37 are provided with circular through holes. The first inner frame member 36 and the second inner frame member 37 are formed in the same shape as each other and are disposed in a reverse posture in the axial line "L" direction.

As shown in FIGS. 3 and 4, an inner peripheral face of the first inner frame member 36 is formed with a ring-shaped protruded part 361 which is protruded to an inner side in the radial direction at an end part on the other side "L2" in the axial line "L" direction. Therefore, when the first inner frame member 36 is press-fitted to the support shaft 30, the support shaft 30 is press-fitted to the ring-shaped protruded part 361. Further, an inner peripheral face of the second inner frame member 37 is formed with a ring-shaped protruded part 371 which is protruded to an inner side in the radial direction at an end part on one side "L1" in the axial line "L" direction. Therefore, when the second inner frame member 37 is press-fitted to the support shaft 30, the support shaft 30 is press-fitted to the ring-shaped protruded part 371.

The magnet 61 is provided with a shaft hole 610 through which the support shaft 30 is penetrated and is fixed to a substantially center in the axial line "L" direction of the support shaft 30. The yoke 35 includes a first yoke 31 overlapped with the magnet 61 on one side "L1" in the axial line "L" direction and a second yoke 32 which is overlapped with the magnet 61 on the other side "L2" in the axial line "L" direction. The first yoke 31 is formed in a circular plate shape which is provided with a shaft hole 310 through which the support shaft 30 is penetrated, and outer diameters of the magnet 61 and the first yoke 31 are substantially equal to each other. The second yoke 32 is structured of two members, i.e., a first magnetic member 33 formed in a cup shape and a second magnetic member 34 formed in a circular plate shape. The first magnetic member 33 is provided with a circular end plate part 331 provided with a shaft hole 330 through which the support shaft 30 is penetrated and a cylindrical tube part 332 which is extended from an outer edge of the end plate part 331 to one side "L1" in the axial line "L" direction. In this embodiment, the end plate part 331 of the first magnetic member 33 is fixed to an end face on the other side "L2" in the axial line "L" direction of the magnet 61. The second magnetic member 34 is provided with a shaft hole 340 through which the support shaft 30 is penetrated and is fixed to the end plate part 331 of the first magnetic member 33 from an opposite side to the magnet 61.

In the movable body, the first inner frame member 36 and the second inner frame member 37 are fixed to the support shaft 30 on both sides in the axial line "L" direction of the magnet 61 and the yoke 35 in a state that the support shaft 30 is penetrated through the shaft holes 310, 610, 330 and 340 of the magnet 61 and the respective members structuring the yoke 35. As a result, the first inner frame member 36 supports the magnet 61 and the yoke 35 from one side "L1" in the axial line "L" direction and the second inner frame member 37 supports the magnet 61 and the yoke 35 from the other side "L2" in the axial line "L" direction, and the magnet 61 and the yoke 35 are fixed to the support shaft 30.

In the second yoke 32, an inside diameter of the cylindrical tube part 332 of the first magnetic member 33 is larger than outside diameters of the magnet 61 and the first yoke 31. Therefore, when the magnet 61 and the first yoke 31 are overlapped with the circular end plate part 331 which is a bottom part of the cylindrical tube part 332, the cylindrical tube part 332 faces an outer peripheral face of the magnet 61 and an outer peripheral face of the first yoke 31 at positions separated from the outer peripheral face of the magnet 61 and the outer peripheral face of the first yoke 31 to an outer side in the radial direction. In this embodiment, a part of the coil 62 is disposed between the cylindrical tube part 332 and the outer peripheral face of the magnet 61. Further, a part of the coil 62 is disposed between the cylindrical tube part 332 and the outer peripheral face of the first yoke 31.

Manufacturing Method of Connection Body

In this embodiment, the first connection body 11 and the second connection body 12 are gel members obtained by molding gel material. When the first connection body 11 is to be molded, the first outer frame member 51 and the first inner frame member 36 are coaxially positioned by a jig to form a ring-shaped space between the first outer frame member 51 and the first inner frame member 36, and gel material is filled in the space and is thermally hardened. As a result, the first connection body 11 is joined to an inner peripheral face of the first outer frame member 51 and to an outer peripheral face of the first inner frame member 36 by adhesiveness of the gel member itself. In this case, joining strength can be enhanced by applying a joining accelerating agent such as primer to the inner peripheral face of the first outer frame member 51 and the outer peripheral face of the first inner frame member 36 before the gel material is filled. The second connection body 12 is, similarly to the first connection body 11, molded so that a ring-shaped space is formed between the second outer frame member 52 and the second inner frame member 37 and gel material is filled in the space and is thermally hardened.

As described above, in this embodiment, the first connection body 11 is structured as one part by joining to the first outer frame member 51 and the first inner frame member 36 at the time of molding. Further, the second connection body 12 is also similarly structured as one part by joining to the second outer frame member 52 and the second inner frame member 37 at the time of molding. Therefore, when the actuator 1 is to be assembled, the support body 2 and the movable body 3 can be connected with each other without performing a bonding process of a gel member.

The first connection body 11 and the second connection body 12 are viscoelastic members. For example, as the first connection body 11 and the second connection body 12, the following materials may be used which include a gel member such as silicone gel, various rubber materials such as natural rubber, diene-based rubber (for example, styrene butadiene rubber, isoprene rubber, butadiene rubber, chloroprene rubber and acrylonitrile butadiene rubber), non-diene-based rubber (for example, butyl rubber, ethylene propylene rubber, ethylene propylene diene rubber, urethane rubber, silicone rubber and fluorine-containing rubber) and thermoplastic elastomer, and their denatured materials. In this embodiment, the first connection body 11 and the second connection body 12 are made of silicone gel whose penetration degree is 90 degrees through 110 degrees.

Partition Part

The actuator 1 is structured so that the connection body 10 in a cylindrical tube shape is disposed in a gap space in the radial direction between the movable body 3 and the support body 2, and that the movable body 3 and the support body 2 are connected with each other through the connection body 10 over the entire periphery. Therefore, in the actuator 1, an inside space of the case 20 is partitioned in the axial line "L" direction by the partition part 9 which includes the connection body 10. In this embodiment, both ends in the axial line "L" direction of the movable body 3 are connected with the support body 2 by the connection bodies 10. Therefore, the partition part 9 is provided at two positions separated in the axial line "L" direction. Hereinafter, the partition part 9 disposed on one side "L1" in the axial line "L" direction is referred to as a first partition part 91, and the partition part 9 disposed on the other side "L2" in the axial line "L" direction is referred to as a second partition part 92. The first partition part 91 includes the first connection body 11. Further, the second partition part 92 includes the second connection body 12.

In this embodiment, the movable body 3 is provided with an inner side ring-shaped part surrounding the support shaft 30, and the support body 2 is provided with an outer side ring-shaped part which faces the inner side ring-shaped part in the radial direction. The connection body 10 connects the inner side ring-shaped part with the outer side ring-shaped part. In this embodiment, the inner side ring-shaped part is the inner frame member (the first inner frame member 36 and the second inner frame member 37) which are fixed to the support shaft 30. On the other hand, the outer side ring-shaped part includes the outer frame member (the first outer frame member 51 and the second outer frame member 52) surrounding the inner frame member and the outer frame member fixing part (the first outer frame member fixing part 41 and the second outer frame member fixing part 25) to which the outer frame member is fixed.

The partition part 9 is structured of the inner side ring-shaped part, the connection body 10 and the outer side ring-shaped part. In this embodiment, the first partition part 91 is structured of the first inner frame member 36 (first inner side ring-shaped part), the first connection body 11, the first outer frame member 51 and the first outer frame member fixing part 41. The first outer frame member 51 and the first outer frame member fixing part 41 structure the first outer side ring-shaped part. The first inner frame member 36 is fixed to an end part on one side "L1" of the support shaft 30, and the first outer frame member fixing part 41 is provided in the coil holder 4 which is fixed to the inner peripheral face of the case 20. Therefore, the first partition part 91 partitions an inside space of the case 20 in the axial line "L" direction. Similarly, the second partition part 92 is structured of the second inner frame member 37 (second inner side ring-shaped part), the second connection body 12, the second outer frame member 52 and the second outer frame member fixing part 25. The second outer frame member 52 and the second outer frame member fixing part 25 structure the second outer side ring-shaped part. The second inner frame member 37 is fixed to an end part on the other side "L2" of the support shaft 30, and the second outer frame member fixing part 25 is integrally formed with the case 20. Therefore, the second partition part 92 partitions the inside space of the case 20 in the axial line "L" direction.

Air Passage

The partition part 9 is provided with an air passage "P" for enhancing fluidity of air in the inside space of the actuator 1. The air passage "P" is a penetration part which penetrates through the partition part 9 in the axial line "L" direction. The air passage "P" is provided in each of the first partition part 91 and the second partition part 92. Hereinafter, the air passage "P" provided in the first partition part 91 is referred to as a first air passage "P1", and the air passage "P" provided in the second partition part 92 is referred to as a second air passage "P2".

As shown in FIG. 3, the first air passage "P1" is provided between the first outer frame member 51 and the first outer frame member fixing part 41 and is communicated with one side "L1" and the other side "L2" with respect to the first partition part 91. As shown in FIG. 7, an inner peripheral face of the first outer frame member fixing part 41 is formed with groove parts 93 which are extended in the axial line "L" direction. As shown in FIG. 5, when the first outer frame member 51 is press-fitted to an inner peripheral side of the first outer frame member fixing part 41, the first air passage "P1" is formed by the outer peripheral face of the first outer frame member 51 and the groove parts 93. In this embodiment, six groove parts 93 are provided at equal intervals in the circumferential direction and thus, the first air passage "P1" is provided at six positions at equal intervals in the circumferential direction.

As shown in FIGS. 3 and 7, an upper end of the groove part 93 is opened in an upper end face of the first outer frame member fixing part 41. Therefore, the first air passage "P1" is communicated with one side "L1" with respect to the first partition part 91. On the other hand, as shown in FIG. 7, a lower end of the groove part 93 is extended to the other side "L2" with respect to the first step part 44 which positions the first outer frame member 51 in the axial line direction and is extended to the other side "L2" with respect to an end face on the other side "L2" of the first outer frame member 51 (see FIG. 3). Therefore, the first air passage "P1" is communicated with the other side "L2" with respect to the first partition part 91.

The first yoke 31 and the magnet 61 structuring the movable body 3 are disposed on the other side "L2" with respect to the first partition part 91. The coil holder 4 is provided with the body part 42 provided on the other side "L2" of the first outer frame member fixing part 41, and a gap space "S1" which serves as an air passage is provided between an inner peripheral face of the body part 42 and outer peripheral faces of the first yoke 31 and the magnet 61. Therefore, air is capable of flowing from one side "L1" to the other side "L2" with respect to the coil holder 4 through the first air passage "P1" and the gap space "S1".

Further, a gap space "S2" which serves as an air passage is provided between outer peripheral faces of the body part 42 and the coil 62 and the cylindrical tube part 332 of the first magnetic member 33, and a gap space "S3" which serves as an air passage is provided between an outer peripheral face of the cylindrical tube part 332 and an inner peripheral face of the case main body 24. Therefore, air having passed to the other side "L2" with respect to the coil holder 4 is capable of passing through the gap space "S2" and "S3" to the other side "L2" with respect to the first magnetic member 33 and the second magnetic member 34.

Next, the second partition part 92 is provided with the second air passage "P2" which penetrates through the second outer frame member fixing part 25. As shown in FIGS. 3 and 6, the second outer frame member fixing part 25 is provided with six penetration parts 94 at equal intervals in the circumferential direction. Each of the penetration parts 94 is the second air passage "P2" which penetrates through an outer peripheral side portion of the second outer frame member fixing part 25 in the axial line "L" direction. Therefore, air is capable of passing from one side "L1" to the other side "L2" with respect to the second partition part 92 through the second air passage "P2".

Operation of Actuator

The actuator 1 is structured so that, when an electric current is supplied to the coil 62, the magnetic drive mechanism 6 generates a drive force for driving the movable body 3 in the axial line "L" direction. When energization to the coil 62 is stopped, the movable body 3 is returned to a home position by a return force of the connection body 10. Therefore, the movable body 3 is vibrated in the axial line "L" direction by intermittently supplying an electric current to the coil 62. Further, when an alternating current waveform applied to the coil 62 is adjusted, acceleration that the movable body 3 is moved to one side "L1" in the axial line "L" direction and acceleration that the movable body 3 is moved to the other side "L2" in the axial line "L" direction can be made different from each other. Therefore, a person who holds a device by hand to which the actuator 1 is attached as a tactile device is capable of bodily sensing vibration having directivity in the axial line "L" direction. Further, a loudspeaker can be structured by utilizing the actuator 1.

When the movable body 3 is vibrated in the axial line "L" direction with respect to the support body 2, the first connection body 11 and the second connection body 12 deform in a shearing direction following the vibration of the movable body 3. A gel member such as silicone gel is provided with linear or nonlinear expansion and contraction characteristics according to its expansion and contraction direction. When a gel member is deformed in a shearing direction, the gel member has a deformation characteristic that a linear component is larger than a non-linear component. Therefore, when the movable body 3 is vibrated in the axial line "L" direction with respect to the support body 2, the first connection body 11 and the second connection body 12 are deformed in a high linearity range and thus, a vibration characteristic whose linearity is satisfactory can be obtained.

When the movable body 3 is moved in the radial direction, the first connection body 11 and the second connection body 12 are deformed in a crushed direction. In this case, a spring constant when a gel member is deformed in a crushing direction is about three times of a spring constant when the gel member is deformed in a shearing direction. Therefore, the movable body 3 is restrained from moving in a direction different from a vibration direction (axial line "L" direction) and collision of the movable body 3 with the support body 2 can be restrained.

In this embodiment, the first air passage "P1" is provided on an outer peripheral side with respect to the first connection body 11, and the second air passage "P2" is provided on an outer peripheral side with respect to the second connection body 12. Therefore, air fluidity in the inside space of the case 20 is satisfactory and thus, air resistance when the movable body 3 is vibrated is small. Accordingly, there is less possibility that air resistance adversely affects the vibration characteristic.

Principal Effects in This Embodiment

As described above, the actuator 1 in this embodiment includes the support body 2, the movable body 3, the connection body 10 which is connected with the support body 2 and the movable body 3 and is provided with at least one of elasticity and viscoelasticity, and the magnetic drive mechanism 6 which includes the magnet 61 and the coil 62 and is structured to relatively move the movable body 3 with respect to the support body 2. The movable body 3 includes the support shaft 30, which supports the magnet 61 on an inner peripheral side with respect to the support body 2, and the inner side ring-shaped part (the first inner frame member 36 and the second inner frame member 37) which surrounds the support shaft 30. The support body 2 includes the outer side ring-shaped part (the first outer frame member 51 and the first outer frame member fixing part 41, and the second outer frame member 52 and the second outer frame member fixing part 25) which faces the inner side ring-shaped part (the first inner frame member 36 and the second inner frame member 37) in the radial direction, the tube-shaped case 20 which surrounds an outer peripheral side of the outer side ring-shaped part, and the first cap member 21 and the second cap member 22 which close end parts of the case 20. The connection body 10 is disposed in a gap space in the radial direction between the inner side ring-shaped part and the outer side ring-shaped part. The inner side ring-shaped part, the outer side ring-shaped part and the connection body 10 structure the partition part 9 which partitions an inside space of the case 20 in the axial line "L" direction of the support shaft 30 and is provided with the air passage "P" which penetrates through the partition part 9 in the axial line "L" direction.

In the actuator 1 in this embodiment, the end parts of the case 20 are closed by the first cap member 21 and the second cap member 22. The inside space of the case 20 is provided with the partition part 9 structured of the connection body 10, the inner side ring-shaped part and the outer side ring-shaped part, and the partition part 9 is provided with the air passage "P". Therefore, air is capable of flowing through the air passage "P" between one side "L1" and the other side "L2" with respect to the partition part 9 and thus, even in a case that an air flowing port is not provided for communicating between the inside and the outside of the case 20, air resistance can be reduced when the movable body 3 is vibrated in the axial line "L" direction. Accordingly, the variation of vibration characteristics due to air resistance can be suppressed. For example, even in a case that gap spaces between the first cap member 21 and the second cap member 22 and the case 20 are sealed in order to prevent sound leakage and entering of contaminations, the variation of vibration characteristics due to air resistance can be suppressed.

In this embodiment, the inner side ring-shaped part is the inner frame member (the first inner frame member 36 and the second inner frame member 37) which is fixed to the support shaft 30, and the outer side ring-shaped part includes the outer frame member (the first outer frame member 51 and the second outer frame member 52), which surrounds the inner frame member, and the outer frame member fixing part (the first outer frame member fixing part 41 and the second outer frame member fixing part 25) which surrounds the outer frame member. The connection body 10 connects the outer frame member with the inner frame member and the air passage "P" is provided between the outer frame member and the outer frame member fixing part (between the first outer frame member 51 and the first outer frame member fixing part 41). Therefore, the air passage "P" is formed between two parts by assembling the outer frame member and the outer frame member fixing part and thus, a part itself is not required to form a penetration part which serves as the air passage "P". Accordingly, a shape of the part can be simplified.

The connection body 10 in this embodiment is a gel member which is molded between the outer frame member and the inner frame member. In other words, the first connection body 11 is directly molded between the first outer frame member 51 and the first inner frame member 36, and the second connection body 12 is directly molded between the second outer frame member 52 and the second inner frame member 37. As described above, a gel member is directly molded between the outer frame member and the inner frame member to structure as one component and thus, the gel member is easily handled when the actuator 1 is to be assembled. Therefore, the actuator 1 is easily manufactured.

In this embodiment, the partition part 9 provided with the connection body 10 is disposed at both ends of the movable body 3 and thus, the both ends of the movable body 3 can be supported by the connection bodies 10. Therefore, the movable body 3 can be stably supported. In other words, the connection body 10 includes the first connection body 11, which connects one end in the axial line "L" direction of the movable body 3 with the support body 2, and the second connection body 12 which connects the other end in the axial line "L" direction of the movable body 3 with the support body 2. The inner side ring-shaped part includes the first inner side ring-shaped part (the first inner frame member 36) connected with the first connection body 11 and the second inner side ring-shaped part (the second inner frame member 37) connected with the second connection body 12. The outer side ring-shaped part includes the first outer side ring-shaped part (the first outer frame member 51 and the first outer frame member fixing part 41) connected with the first connection body 11 and the second outer side ring-shaped part (the second outer frame member 52 and the second outer frame member fixing part 25) connected with the second connection body 12. The partition part 9 includes the first partition part 91 provided with the first inner side ring-shaped part (the first inner frame member 36), the first outer side ring-shaped part (the first outer frame member 51 and the first outer frame member fixing part 41), and the first connection body 11, and the second partition part 92 provided with the second inner side ring-shaped part (the second inner frame member 37), the second outer side ring-shaped part (the second outer frame member 52 and the second outer frame member fixing part 25), and the second connection body 12. The air passage "P" includes the first air passage "P1" provided in the first partition part 91 and the second air passage "P2" provided in the second partition part 92. Therefore, in this embodiment, the air passage "P" is provided in both of the two partition parts 9 and thus, air resistance can be reduced when the movable body 3 is vibrated in the axial line "L" direction.

In this embodiment, the first inner side ring-shaped part is the first inner frame member 36 which is fixed to the support shaft 30. Further, the first outer side ring-shaped part includes the first outer frame member 51 surrounding the first inner frame member 36 and the first outer frame member fixing part 41 surrounding the first outer frame member 51. The first outer frame member fixing part 41 is provided in the coil holder 4 which is disposed on an inner peripheral side of the case 20. As described above, in this embodiment, the connection body 10 is connected with the support body 2 through the coil holder 4. Therefore, an outer frame member fixing part is not required to provide separately from the coil holder 4 and thus, a structure of the actuator 1 can be simplified. Further, the first connection body 11 can be disposed on an inner peripheral side with respect to the coil holder 4 and thus, a size in the axial line "L" direction of the actuator 1 can be reduced.

In this embodiment, the first air passage "P1" is provided between the first outer frame member 51 and the first outer frame member fixing part 41. Therefore, when the first outer frame member 51 and the first outer frame member fixing part 41 are assembled, the air passage "P" is formed between both parts and thus, the part itself is not required to form a penetration part which serves as the air passage "P". Therefore, a shape of the part can be simplified.

In this embodiment, the groove part 93 extended in the axial line "L" direction is provided on an inner peripheral face of the first outer frame member fixing part 41, and a gap space between the groove part 93 and an outer peripheral face of the first outer frame member 51 is used as the first air passage "P1". Therefore, in order that the first air passage "P1" is provided, in a case that the coil holder 4 provided with the first outer frame member fixing part 41 is to be manufactured by using resin, it is sufficient that the groove part 93 which serves as the first air passage "P1" is molded on an inner peripheral face of the first outer frame member fixing part 41 and, when the first outer frame member 51 and the first outer frame member fixing part 41 are assembled, the first air passage "P1" can be formed between the two parts.

In this embodiment, the coil holder 4 is adhesively bonded to the inner peripheral face of the case 20. As described above, even in a case that a gap space between the case 20 and the coil holder 4 is sealed by an adhesive, according to this embodiment, the air passage "P" is secured in another portion. Therefore, air resistance when the movable body 3 is vibrated in the axial line "L" direction is small.

In this embodiment, the first cap member 21 closing one end of the case 20 and the second cap member 22 closing the other end of the case 20 are provided, and a gap space between the case 20 and the first cap member 21 and a gap space between the case 20 and the second cap member 22 are sealed by sealing material such as an adhesive. Therefore, an air flowing port which communicates the inside of the case 20 with the outside can be reduced or eliminated and thus, entering of contaminations into the inside of the case 20 can be restrained. Accordingly, there is less possibility that contaminations adversely affect the magnetic drive mechanism 6 and the connection body 10. Further, operation sound which is leaked out to the outside of the case 20 can be reduced.

In this embodiment, the case 20 is provided with the cut-out part 65 where the wiring circuit board 7 for supplying electric power to the coil 62 is disposed, and a gap space between the case 20 and the wiring circuit board 7 is sealed by sealing material such an adhesive. Therefore, entering of contaminations through a gap space from which wiring for power feeding is extended can be suppressed. Further, operation sound which is leaked out to the outside of the case 20 can be reduced.

In this embodiment, an adhesive is used as sealing material, and a gap space is sealed by utilizing an adhesive for fixing two parts to each other. Therefore, the gap space is easily sealed. Further, another process for applying sealing material is not required to be separately performed.

In this embodiment, a plurality of the first air passages "P1" and a plurality of the second air passages "P2" are provided at intervals in the circumferential direction. Therefore, air can be flowed uniformly. Further, a flowing amount of air is increased and thus, air resistance can be further reduced.

Modified Embodiments

In the embodiment described above, the first air passage "P1" is provided between the first outer frame member fixing part 41 and the first outer frame member 51. However, the first air passage "P1" may be provided in any portion of the first partition part 91. For example, it may be structured that a penetration part is formed in an inside of the first outer frame member 51 or in the first inner frame member 36 and the penetration part is used as an air passage. Alternatively, it may be structured that a penetration part is formed in the first outer frame member fixing part 41 and the penetration part is used as an air passage. Further, an air passage may be formed between the first inner frame member 36 and an inner peripheral face of the first connection body 11, or between the first outer frame member 51 and an outer peripheral face of the first connection body 11. Similarly, the second air passage "P2" may be provided in any portion of the second partition part 92.

In the embodiment described above, a plurality of the first air passage "P1" is provided at equal intervals in the circumferential direction. However, the number and the arrangement of the first air passages "P1" are not limited to the embodiment described above and may be appropriately modified. Similarly, the number and the arrangement of the second air passages "P2" are not limited to the embodiment described above and may be appropriately modified.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
    a support body;
    a movable body;
    a connection body which is connected with the support body and the movable body and is provided with at least one of elasticity and viscoelasticity; and
    a magnetic drive mechanism which comprises a magnet and a coil and is structured to relatively move the movable body with respect to the support body;
   wherein one of the movable body and the support body comprises:
      a support shaft which supports one of the magnet and the coil on an inner peripheral side with respect to an other of the movable body and the support body; and
      an inner side ring-shaped part which surrounds the support shaft;
   wherein the other of the movable body and the support body comprises:
      an outer side ring-shaped part which faces the inner side ring-shaped part in a radial direction;
      a case in a tube shape which surrounds an outer peripheral side of the outer side ring-shaped part; and
      a cap member which closes an end part of the case;
   wherein the connection body is disposed in a gap space in the radial direction between the inner side ring-shaped part and the outer side ring-shaped part;
   wherein the inner side ring-shaped part, the outer side ring-shaped part and the connection body structure a partition part which partitions an inside space of the case in an axial line direction of the support shaft; and
   wherein the partition part comprises an air passage which is penetrated through the partition part in the axial line direction,
   wherein
   the inner side ring-shaped part is an inner frame member which is fixed to the support shaft,
   the outer side ring-shaped part comprises an outer frame member surrounding the inner frame member and an outer frame member fixing part surrounding the outer frame member,
   the connection body connects the outer frame member with the inner frame member, and
   the air passage is provided between the outer frame member and the outer frame member fixing part.

2. The actuator according to claim 1, wherein the connection body is a gel member which is molded between the outer frame member and the inner frame member.

3. The actuator according to claim 1, wherein
   the case comprises a cut-out part where a circuit board for supplying electric power to the coil is disposed, and
   a gap space between the case and the circuit board is sealed by sealing material.

4. The actuator according to claim 1, wherein the air passage is provided at a plurality of positions at intervals in a circumferential direction.

5. The actuator according to claim 1, wherein
   the cap member comprises a first cap member which closes one end of the case and a second cap member which closes an other end of the case, and
   a gap space between the case and the first cap member and a gap space between the case and the second cap member are sealed by sealing material.

6. The actuator according to claim 5, wherein the sealing material is an adhesive.

7. The actuator according to claim 1, wherein
   the connection body comprises:
      a first connection body which connects one end in the axial line direction of the movable body with the support body; and
      a second connection body which connects an other end in the axial line direction of the movable body with the support body,
   the inner side ring-shaped part comprises a first inner side ring-shaped part connected with the first connection body and a second inner side ring-shaped part connected with the second connection body,
   the outer side ring-shaped part comprises a first outer side ring-shaped part connected with the first connection body and a second outer side ring-shaped part connected with the second connection body,
   the partition part comprises:
      a first partition part comprising the first inner side ring-shaped part, the first outer side ring-shaped part and the first connection body; and
      a second partition part comprising the second inner side ring-shaped part, the second outer side ring-shaped part and the second connection body, and
   the air passage comprises a first air passage provided in the first partition part and a second air passage provided in the second partition part.

8. The actuator according to claim 7, wherein
   the first inner side ring-shaped part is a first inner frame member which is fixed to the support shaft, the first outer side ring-shaped part comprises a first outer frame member surrounding the first inner frame member and a first outer frame member fixing part surrounding the first outer frame member, and the first outer frame member fixing part is provided in a coil holder which is disposed on an inner peripheral side of the case.

9. The actuator according to claim 8, wherein the first air passage is provided between the first outer frame member and the first outer frame member fixing part.

10. The actuator according to claim 8, wherein the coil holder is adhesively bonded to an inner peripheral face of the case.

11. The actuator according to claim 9, wherein an inner peripheral face of the first outer frame member fixing part comprises a groove part which is extended in the axial line direction, and the first air passage is a gap space between the groove part and an outer peripheral face of the first outer frame member.

\* \* \* \* \*